Patented Feb. 13, 1934

1,947,320

UNITED STATES PATENT OFFICE 1,947,320

REMEDY FOR COMBATING DISEASES OF PLANTS AND IN A PROCESS FOR APPLYING SAME

Georges Truffaut, Versailles, and Isaak Pastak, Viroflay, France, assignors to the firm of Societe Anonyme Etablissements et Laboratories Georges Truffaut, Versailles, France No Drawing. Application August 7, 1930, Serial No. 473,758, and in France August 16, 1929

2 Claims. (Cl. 167—22)

The present invention relates to new remedies for combating diseases of plants consisting in a combination of organic coloring matters with substances lowering the surface tension of water, and if desired, further with known remedies for protection of the plant. It comprises the said remedies themselves and their application to the plant.

Although the bactericidal action of a certain number of organic dyestuffs has been known for a long time it has not hitherto been proposed to use these dyestuffs for protecting plants from the attack of various cryptogams or bacteria.

In fact, the fungi which attack plants, whether they have a velvety surface or not, are not readily wetted by spraying with a simple solution of a dyestuff; the droplets of the spray fall off the surface and are not retained by the damaged leaves, so that the result is nil, and the fungi are unaffected and continue to develop. The action of the dyestuffs has been without effect.

According to this invention, the organic coloring matters are applied to the plants in combination with one or more substances that facilitate the penetration of the dyestuff into the cells of the fungi.

As dyestuffs to be used may be named by way of example water-soluble derivatives of the following families—

Derivatives of thiazine, of oxazine, of azines, of indophenols, of indoanilines, of thiazoles, of quinoline, of acridine, of xanthene, of di- or triphenylmethane, as well as azo-bodies.

In particular several members of the said families may be named:—

Tetraiodo-dichloro-fluorescein-ethylester potassium salt.

Diethyl-diamino-anhydro-dihydroxy-triphenylmethane-carboxylic acid-ethylester potassium salt.

Tetramethyl-α-naphthyl-triamino-triphenylchlormethane.

Tetraethyl-diamino-triphenyl-chlormethane.

Diaminoacridine-acetate.

Tetramethyl-diamino-diphenyl-methylene-imine-hydrochloride.

Phenylazo-phenylene-diamine-hydrochloride.

Hexamethyl-p-rosaniline-hydrochloride etc.

The products which allow the said dyestuffs to fix themselves on the spores, the conidia, the hyphæ and the mycelia and to penetrate into the cells of the fungus, are such as have a capacity for lowering the surface tension of water.

By way of example may be cited gall and the products which enter into the composition thereof, as well as the derivatives of such products; the residues from the manufacture of sulfite cellulose and of soda cellulose; the substituted amides of the fatty acids, the salts of fatty acids or of hydro-aromatic acids; the sulfonic acid salts produced by the sulfonation of mono- or poly-nuclear hydrocarbons, substituted or not by one or more radicals or atoms; pyridine and its analogues or homologues, whether sulfonated or not; hydroxy- and oxy-derivatives, whether aromatic or not; and products of their hydrogenation, as well as analogues and homologues of these products; sulfonation products of hydroxy-acids; sulfonation products of resin, of pitch, or of tar oil, or of petroleum pitch and analogous substances; glucosides of the type of saponin.

A simple mixture of one of the aforesaid dyestuffs with one of the products that diminish the surface tension of water, or a mixture of one or more of the dyestuffs with one or more of the products which diminish the surface tension of water may be used. One may also prepare salts of dyestuff bases with such acids which, as for instance sulfonic acids, lower the surface tension of water. Of course only such wetting agents are to be used which yield water-soluble mixtures with the dyestuff employed.

The various mixtures may be associated with anticryptogamic products or insecticides of known kind (such as cupric salts, cupriferous liquors, the insoluble salts of arsenious and arsenic acids, as well as solutions of various alkaloids). For instance it was found that addition of cupric salts, such as, for example, copper sulfate or copper acetate in quantities which are themselves hardly active may considerably enhance the activity of the above described mixtures of coloring matters with substances lowering the surface tension of water. Such mixtures of coloring matters, wetting agents, and known anticryptogamic or insecticidal products or of course meant to be included within the scope of the present invention.

The several mixtures may be applied in aqueous solution or dispersed and diluted in the form of dust (by addition of the aforesaid mixtures to inert powders, such as chalk, mica or dolomite). One may perform the treatment also in such a manner that first the wetting agent and then the dyestuff is applied.

The products obtained in the above manner are distinguished from those hitherto used in that their action is curative instead of being simply preventive, and may thus be used in the course of an epidemic, and even to check the development of virulent attack.

They may also be used for treating grain or seeds for the purpose of freeing them from rust, rot, mildew or the like.

They may also be used for the complete or partial sterilization of infected soils, as well as for curing or reducing vegetable tumours, certain bacterial diseases, or other troubles produced by nematodes, or for sterilizing the eggs of certain acaridae and certain insects.

What we claim is:—

1. A remedy for combating diseases of plants comprising a mixture of a water soluble organic coloring matter with a substance lowering the surface tension of water and being selected from the group consisting of substituted amides of fatty acids, sulfonic acid salts produced by the sulfonation of mono-nuclear hydrocarbons, sulfonic acid salts produced by the sulfonation of poly-nuclear hydrocarbons, sulfonic acid salts produced by the sulfonation of mono-nuclear hydrocarbons having a substituent and sulfonic acid salts produced by the sulfonation of poly-nuclear hydrocarbons having a substituent.

2. A remedy for combating diseases of plants comprising a mixture of a water soluble organic coloring matter and a wetting agent comprising a substituted amide of a fatty acid.

GEORGES TRUFFAUT.
ISAAK PASTAK.